(12) United States Patent
Furstenberg et al.

(10) Patent No.: US 11,262,241 B2
(45) Date of Patent: Mar. 1, 2022

(54) LASER SPECKLE REDUCTION AND PHOTO-THERMAL SPECKLE SPECTROSCOPY

(71) Applicant: The Government of the United States of America, as represented by the Secretary of the Navy, Arlington, VA (US)

(72) Inventors: Robert Furstenberg, Burke, VA (US); Chris Kendziora, Burke, VA (US); R. Andrew McGill, Lorton, VA (US)

(73) Assignee: The Government of the United States of America, as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 16/983,578

(22) Filed: Aug. 3, 2020

(65) Prior Publication Data
US 2020/0363264 A1    Nov. 19, 2020

Related U.S. Application Data

(62) Division of application No. 15/946,844, filed on Apr. 6, 2018, now abandoned.
(Continued)

(51) Int. Cl.
| | |
|---|---|
| *G01N 21/00* | (2006.01) |
| *G01J 3/28* | (2006.01) |
| *G01J 3/10* | (2006.01) |
| *G01J 3/433* | (2006.01) |
| *G01J 3/447* | (2006.01) |

(Continued)

(52) U.S. Cl.
CPC .............. *G01J 3/2823* (2013.01); *G01J 3/021* (2013.01); *G01J 3/0205* (2013.01); *G01J 3/0218* (2013.01); *G01J 3/108* (2013.01); *G01J 3/4338* (2013.01); *G01J 3/447* (2013.01); *G01N 21/1717* (2013.01); *G01N 21/39* (2013.01); *G01N 21/4788* (2013.01); *G01N 21/636* (2013.01); *G02B 27/48* (2013.01); *G01J 3/433* (2013.01); *G01N 21/45* (2013.01); *G01N 2021/1725* (2013.01); *G01N 2021/399* (2013.01); *G01N 2021/479* (2013.01)

(58) Field of Classification Search
CPC .... G01J 3/2823; G01J 3/453; G01N 21/1717; G01N 21/1725; G01N 21/479; G02B 27/48; G01B 9/02094; G01B 9/02095
See application file for complete search history.

(56) References Cited

U.S. PATENT DOCUMENTS

| | | | | |
|---|---|---|---|---|
| 2002/0016533 A1* | 2/2002 | Marchitto | ............ | A61B 5/0066 600/310 |
| 2012/0277559 A1* | 11/2012 | Kohl-Bareis | ........ | A61B 5/0261 600/324 |

(Continued)

*Primary Examiner* — Tarifur R Chowdhury
*Assistant Examiner* — Jonathon Cook
(74) *Attorney, Agent, or Firm* — US Naval Research Laboratory; Rebecca L. Forman

(57) ABSTRACT

A photo-thermal speckle spectroscopy device having an infrared laser, a visible laser, a foam, and a camera. The infrared and visible lasers are focused on the foam, which causes the visible laser to scatter. A camera records the speckle pattern, which shifts when the IR laser is turned on. The related method of photo-thermal speckle spectroscopy is also disclosed.

8 Claims, 12 Drawing Sheets

Related U.S. Application Data

(60) Provisional application No. 62/482,643, filed on Apr. 6, 2017.

(51) Int. Cl.
*G01N 21/17* (2006.01)
*G01N 21/47* (2006.01)
*G01N 21/63* (2006.01)
*G01J 3/02* (2006.01)
*G01N 21/39* (2006.01)
*G02B 27/48* (2006.01)
*G01N 21/45* (2006.01)

(56) References Cited

U.S. PATENT DOCUMENTS

2017/0211977 A1\* 7/2017 Jeys .................... G01N 21/1717
2017/0227459 A1\* 8/2017 Yamazaki ........ H04N 5/232121

\* cited by examiner

LASER SPECKLE REDUCTION AND PHOTO-THERMAL SPECKLE SPECTROSCOPY

PRIORITY CLAIM

The present application is a divisional application claiming the benefit of U.S. application Ser. No. 15/946,844 filed on Apr. 6, 2018 by Robert Furstenberg et al., entitled "LASER SPECKLE REDUCTION TECHNIQUES FOR MICROSCOPY AND SPECTROSCOPY," which claimed the benefit of U.S. Provisional Application No. 62/482,643 filed on Apr. 6, 2017 by Robert Furstenberg et al., entitled "LASER SPECKLE REDUCTION TECHNIQUES FOR MICROSCOPY AND SPECTROSCOPY," the entire contents of each are incorporated herein by reference.

CROSS REFERENCE

Cross reference is made to application Ser. No. 15/946,858, issued as U.S. Pat. No. 10,690,933 on Jun. 23, 2020, entitled LASER SPECKLE INSTRUMENT, to Robert Furstenberg et al., the disclosure and contents of which are incorporated herein by reference in its entirety.

BACKGROUND OF THE INVENTION

Field of the Invention

The present invention relates to laser speckle reduction and to a method for photo-thermal speckle spectroscopy.

Description of the Prior Art

Due to their high brightness, infrared (IR) lasers (such as tunable quantum cascade lasers (QCLs)) are very attractive illumination sources in both stand-off spectroscopy and micro-spectroscopy. In fact, they are the enabling device for trace-level spectroscopy. However, due to their high coherence as laser beams, QCLs can cause speckle, especially when illuminating a rough surface. This is highly detrimental to the signal-to-noise ratio (SNR) of the collected spectra and can easily negate the gains from using a high brightness source. In most cases, speckle reduction is performed at the expense of optical power.

When coherent light (such as light from a laser source) illuminates a rough surface, the resulting image contains a granular pattern called speckle (Goodman, Speckle Phenomena in Optics, Roberts & Company, Englewood Colo. (2007)). A typical speckle pattern is shown in FIG. 1. The speckle grain size and distances from neighboring grains is often very sensitive to changes in sample geometry, optical configuration, and wavelength of light used. Speckle can be modeled by considering the speckle pattern to be due to interference from a collection of scattering centers. FIG. 2 illustrates this concept.

In many applications, speckle is a nuisance as it obfuscates the real signal (e.g. reflectance, transmittance etc.) from the sample. Depending on the speckle contrast (as defined by the fluctuations of speckle intensity), it can reach levels where the signal to noise ratio of the detection system is speckle limited. Therefore, it is imperative to reduce speckle contrast but without an associated reduction in signal-to-noise due to lower laser power throughput. This is very hard to do as "de-speckling" invariably comes with a decrease in the optical power of the de-speckled laser light. Ideally, a speckle-reduction optical setup will allow for tuning the amount of speckle reduction.

There are several strategies for reducing speckle. Spatial averaging involves combining multiple pixels to wash-out speckle contrast. Temporal averaging involves collecting signal over a longer time or combining consecutive camera frames. Spectral averaging involves reducing spectral resolution by smoothing, which reduces speckle contrast. Polarization averaging involves combining the signal from illuminating with two polarization states of the laser. A de-speckling procedure can involve a coherent illumination wavefront becoming an incoherent wavefront.

BRIEF SUMMARY OF THE INVENTION

The present invention provides for laser speckle reduction and for exploiting speckle from rough surfaces for the detection of trace amounts of chemicals. Laser speckle is very sensitive to small movements in the imaging setup. Heating the speckle-inducing substrate causes it to expand and the resulting speckle to change. The amount of speckle change is proportional to the increase in temperature, which is in turn proportional to the infrared (IR) absorption spectrum of the analyte to detect. This provides an inexpensive and simple, yet highly sensitive detection mechanism for trace amounts of analyte.

There are several advantages with the present invention. It is more sensitive than prior art techniques due to multi-pixel sensitivity. It uses less expensive (visible) components. Also, it can be tailored to the desired application.

These and other features and advantages of the invention, as well as the invention itself, will become better understood by reference to the following detailed description, appended claims, and accompanying drawings.

BRIEF DESCRIPTION OF THE DRAWINGS

FIG. 5A shows an image with the diffuser with no spinning. FIG. 5B shows an image of the shiny side (without the diffuser) with spinning.

FIG. 5C shows an image with a diffuser with spinning. A dramatic improvement in speckle reduction is achieved by spinning the Infragold® diffuser. Also, it is demonstrated that having a good diffusive reflectance properties of the spinning diffuser is essential (Infragold vs. its shinier, but still somewhat rough side).

As shown in FIG. 6A, with the diffuser motor off, the speckle is still present. As shown in FIG. 6B, with the diffuser spinning, speckle is eliminated.

As shown in FIG. 7A, using a free-space laser beam results in a fully developed speckle. As shown in FIG. 7B, using a fiber-coupled laser beam results in a dense speckle pattern with lower speckle contrast. As shown in FIG. 7C, using the speckle reduction approach of a spinning diffuser prior to fiber coupling results in no evidence of speckle.

FIG. 9A shows a thermal image of a hot wire. FIG. 9B shows an active, laser reflectance micrograph using a speckle reduction unit with the spinning diffuser stopped. FIG. 9C shows an active, laser reflectance micrograph using a speckle reduction unit with the diffuser spinning (for maximum speckle reduction potential).

As shown in FIG. 10A, when the illumination is less coherent, the micrographs are nearly identical. However, as shown in FIG. 10B, without good speckle reduction, the images change with wavelength considerably.

DETAILED DESCRIPTION OF THE INVENTION

The prevent invention relates to speckle reduction approaches and their ability to reduce speckle contrast while at the same time preserving a high optical throughput. Multi-mode fibers, integrating spheres, and stationary and moving diffusers may be used for speckle reduction. Speckle-contrast can be measured directly by acquiring beam profiles of the illumination beam or, indirectly, by observing speckle formation from illuminating a rough surface (e.g. Infragold® coated surface) with an IR microbolometer camera. Speckle contrast reduction is characterized from spatial, temporal and wavelength averaging for both CW and pulsed QCLs. Examples of effect of speckle-reduction on hyperspectral images in both standoff and microscopy configurations are provided herein.

Experimental Setup

Speckle was generated by using a tunable QCL ("MIRcat" by Daylight Solutions) tuned to approximately 8 μm. Direct speckle was observed by imaging of the output from an IR multi-mode optical fiber ("PIR400" by Newport; 400 μm core, 0.25NA, 1 m, SMA terminated) by an optical beam profiler ("Pyrocam III" by Ophir/Spiricon). Indirect speckle was observed by imaging the speckle pattern formed by reflecting the beam off a rough (anodized aluminum part by 80/20 Inc.) by either a FLIR "E60" or FLIR "Photon Block 2" micro-bolometer. The micro-bolometers were equipped with wide-angle lenses. Both micro-bolometers have a built-in 7-14 μm bandpass filter.

Speckle Identification

Figure 1:
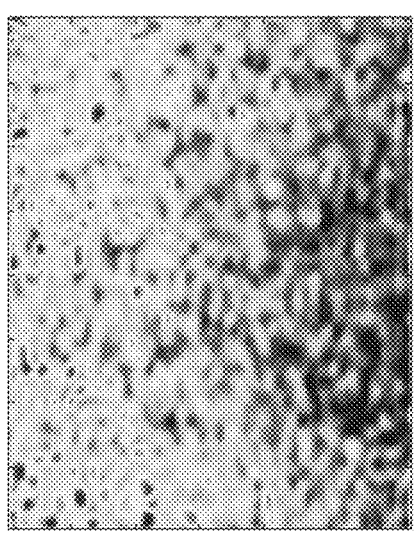
FIG. 1 shows a typical speckle pattern.
Figure 2:
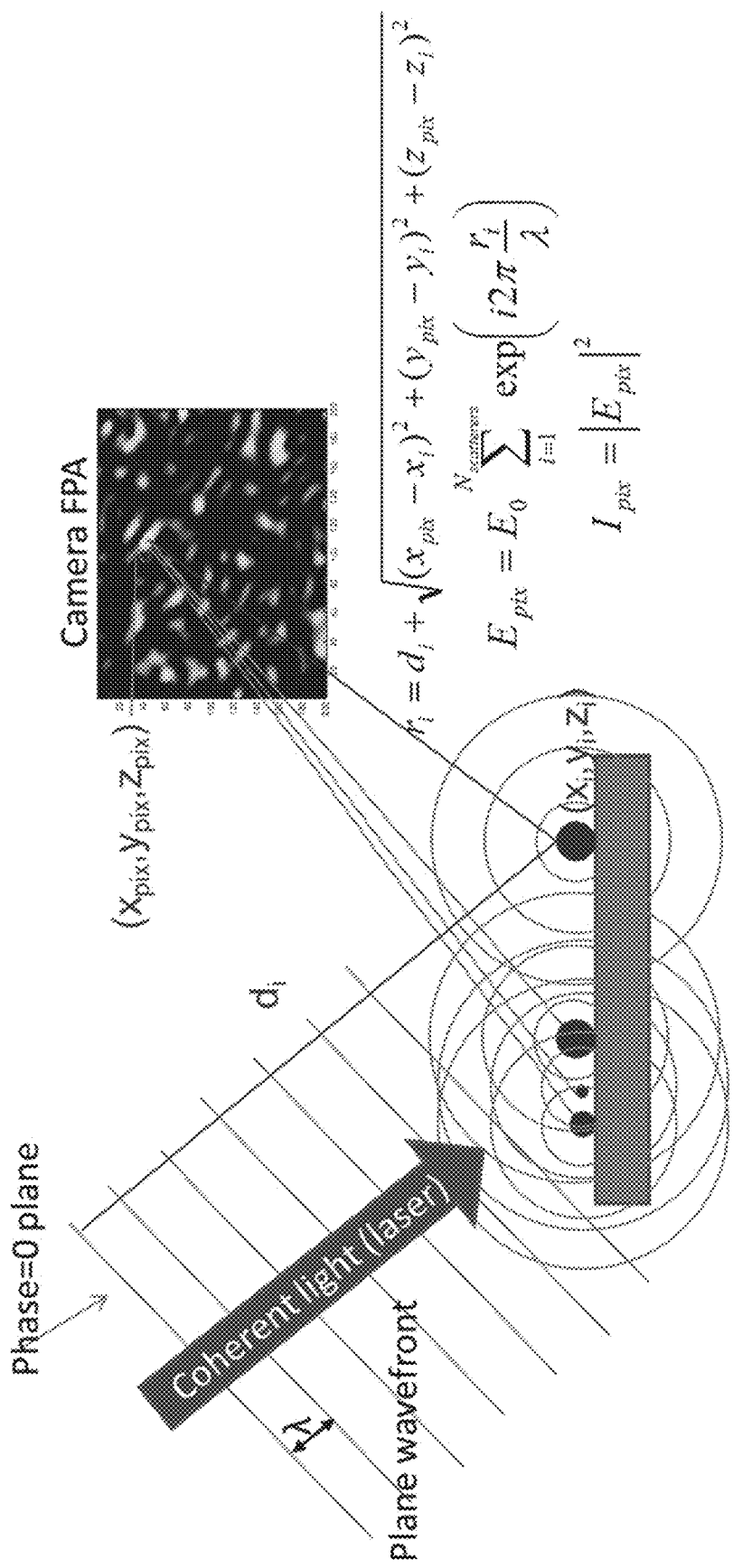
FIG. 2 is an illustration of speckle pattern formation and its modeling.
Figure 3:
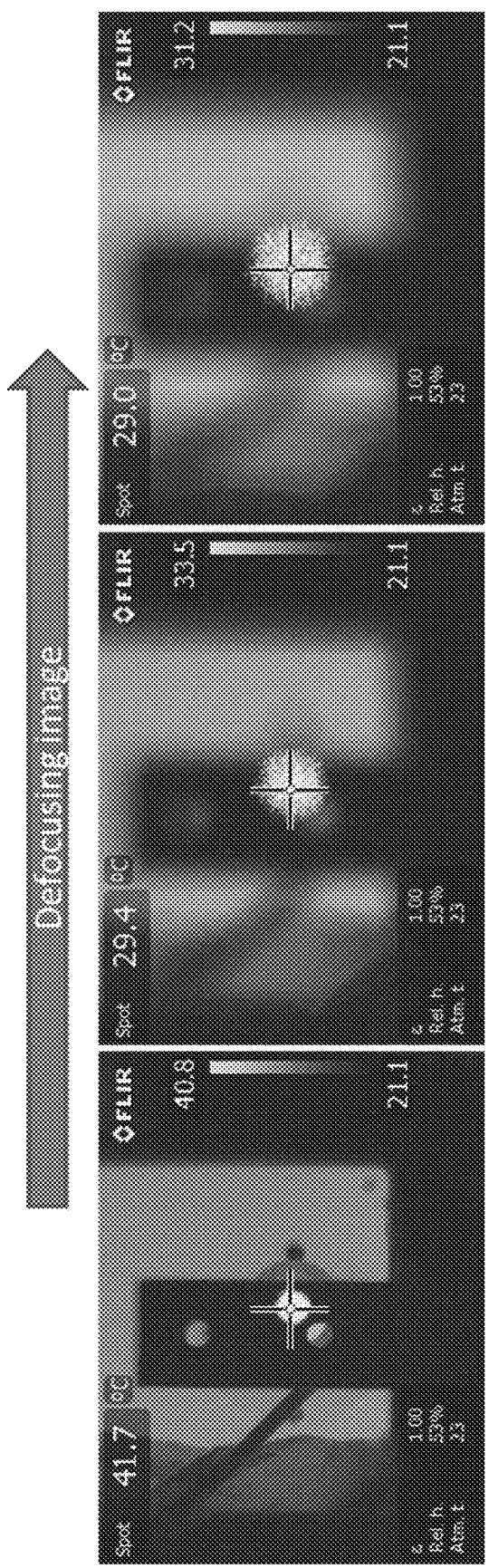
FIG. 3 shows images from a thermal imaging camera of an infrared speckle off a rough surface. Speckle exhibits the peculiar property that it appears focused in an otherwise defocused image.

In this experiment, we observed the speckle pattern off a rough (anodized aluminum) surface using a FLIR "E60" thermal imaging camera, as shown in FIG. 3. To distinguish between speckle and some other cause for the observed pattern, the camera lens was defocused and it was observed that the speckle pattern remained in focus which is a known property of speckle.

Speckle Reduction Setup

Figure 4:
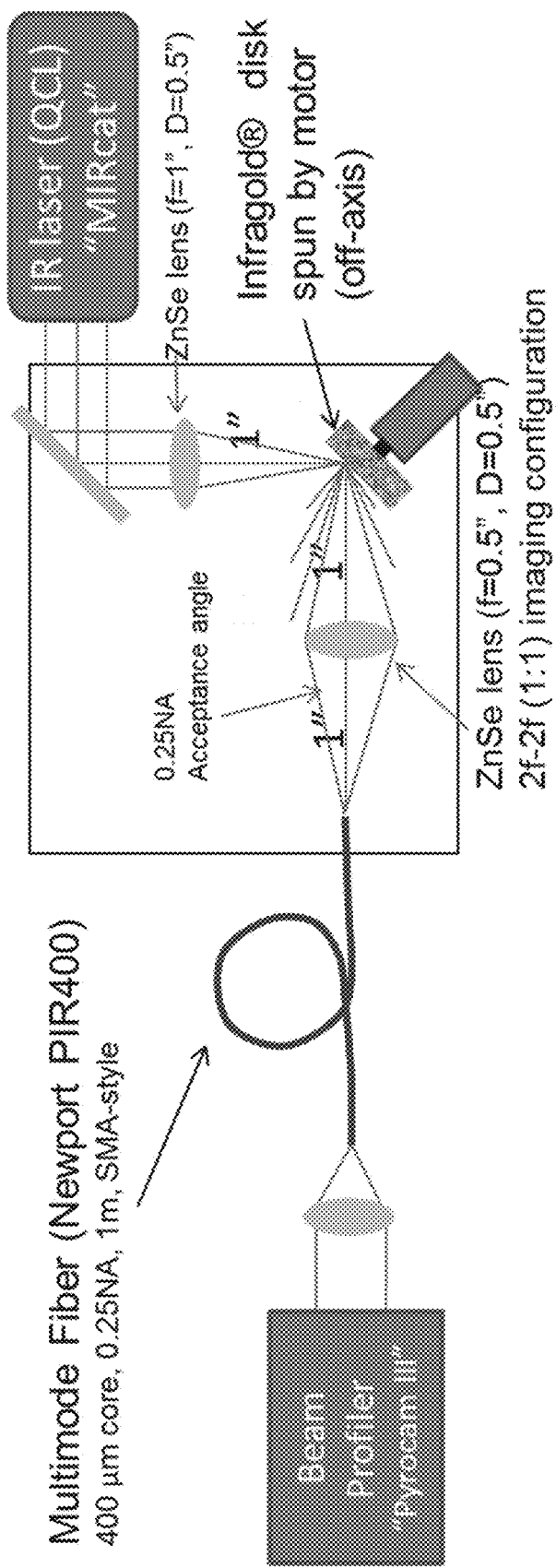
FIG. 4 is a schematic drawing of a speckle-reducing setup.

To reduce speckle formation, the laser beam needs to be conditioned. Our solution used a two-step approach: First, we reflected the IR laser off a rotating Infragold® diffuse surface. The rotation insured that we got a decrease in speckle contrast due to temporal averaging. Next, the diffusely reflected light was collected by a lens and coupled into a multi-mode optical fiber for further speckle reduction. A schematic of the setup is shown in FIG. 4.

Figures 5A, 5B, 5C:
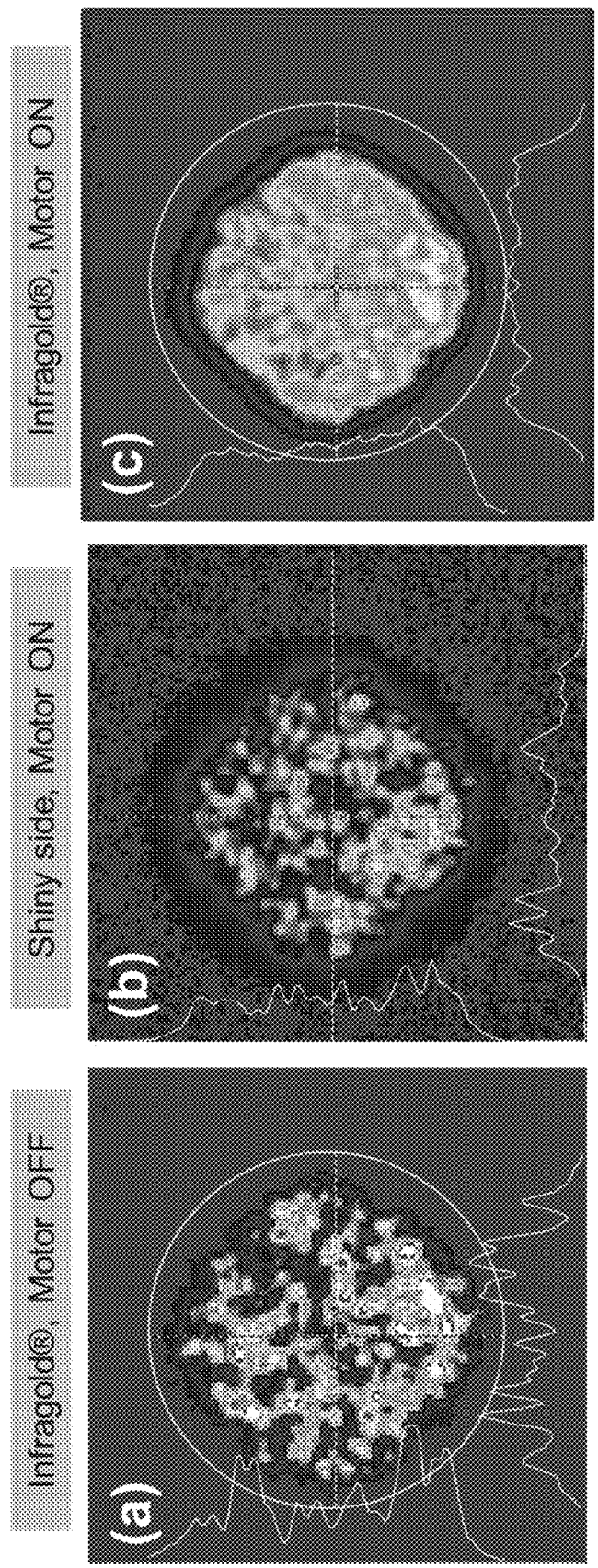
FIGS. 5A-5C shows images of direct speckle observation by imaging the output of the multi-mode fiber onto the beam profiler.

The output from the multimode fiber was imaged on the beam profiler and is shown in FIGS. 5A-5C. FIG. 5A shows an image with the diffuser not spinning. FIG. 5B shows an image of the shiny side (without the diffuser) with spinning. FIG. 5C shows an image with the diffuser spinning. It can be seen from FIG. 5A that the diffuser alone is not enough to de-cohere the beam to a satisfactory level. It is only after the diffuser starts spinning that we get a good speckle reduction, as seen in FIG. 5C. Without the diffuser (when we flip it to its shiny side), the spinning alone cannot remove speckle, as seen in FIG. 5B. Therefore, it is only the combination of diffuser and the temporal averaging from its spinning that can reduce speckle to acceptable levels.

Figure 6B:
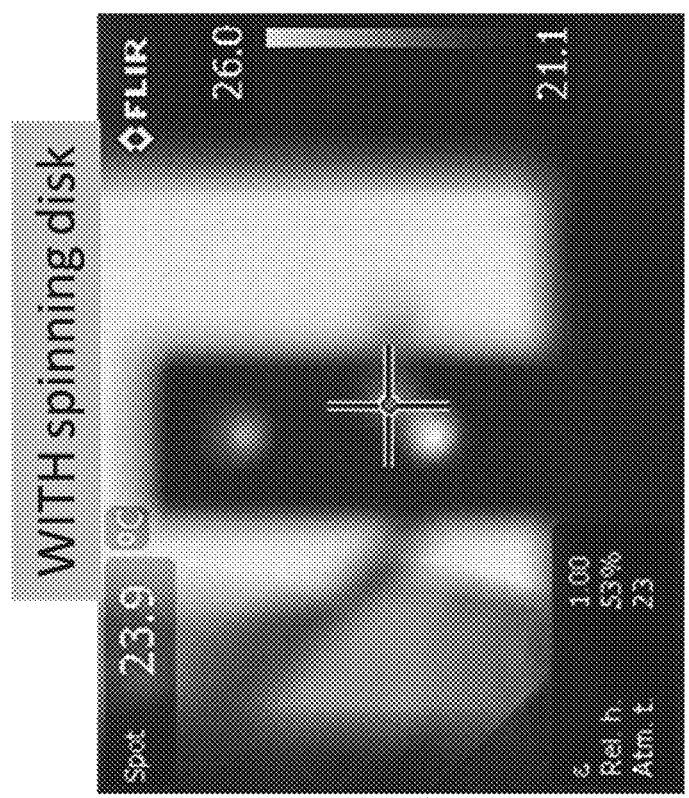
FIGS. 6A and 6B show images after illuminating a rough surface with light from the speckle-reduction unit.
Figure 6A:
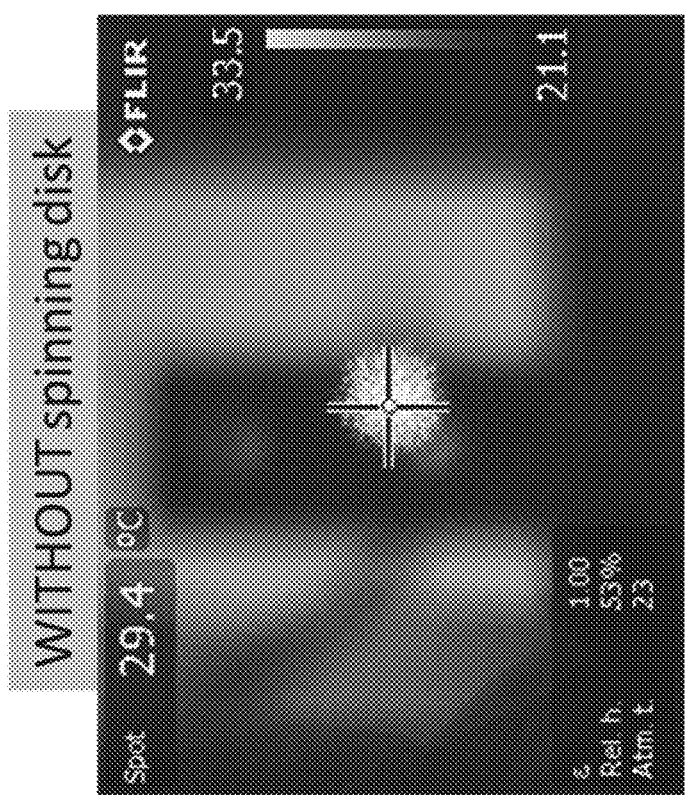

To further test the de-speckling performance, the light was used to illuminate an anodized aluminum surface (80/20 Inc. part). Without the diffuser spinning, the speckle is clearly visible, as seen in FIG. 6A. With the diffuser spinning, speckle is eliminated, as shown in FIG. 6B.

Figures 7A, 7B, 7C:
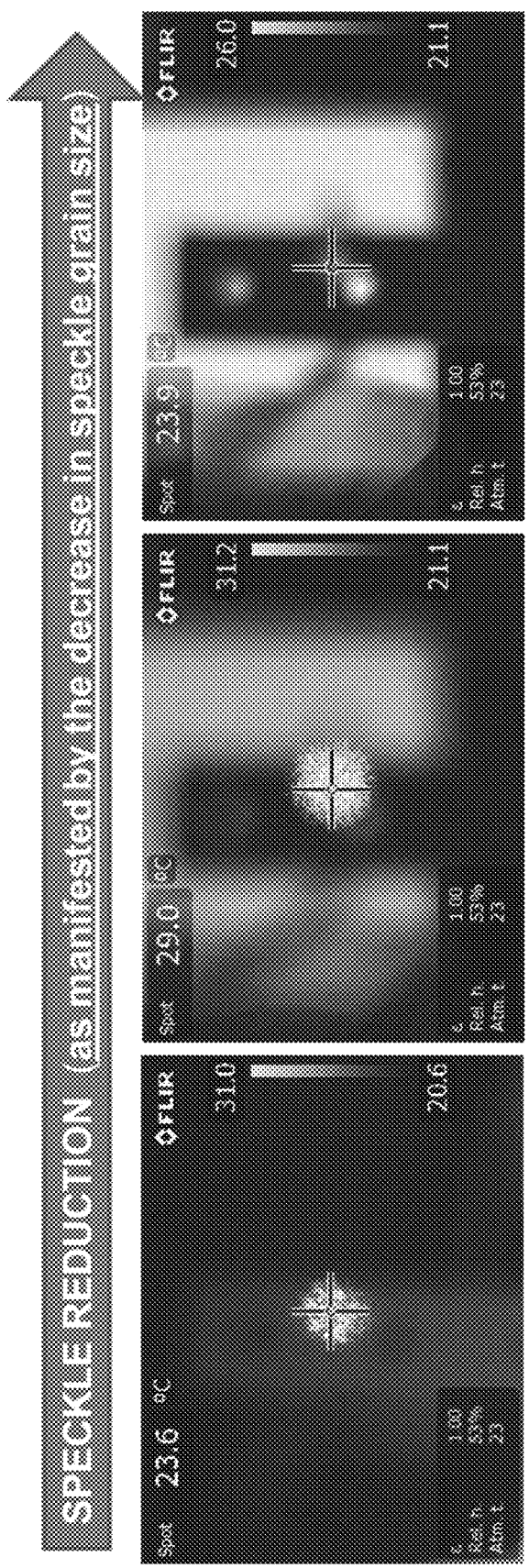
FIGS. 7A-7C compare the effect of different illumination modes on speckle formation.

In FIGS. 7A-7C, we compare side-by-side the effect of different illumination modes (from completely coherent, free space illumination, to more incoherent illuminations) on speckle formation. In FIG. 7A, a fully developed speckle is seen when using a free-space laser beam. In FIG. 7B, a dense speckle pattern and lower speckle contrast is seen when using a fiber-coupled laser beam. In FIG. 7C, the speckle is completely eliminated, when using our speckle reduction approach of a spinning diffuser prior to fiber coupling.

Speckle in IR Microscopy

In a microscopy configuration speckle reduction appears to be harder to achieve (Furstenberg et al., "Advances in photo-thermal infrared imaging microspectroscopy," Proc. SPIE 8729, 87290H (2013); Furstenberg et al., "Chemical Imaging using Infrared Photo-thermal Microspectroscopy", Proc. SPIE 8374, 837411 (2012); and Furstenberg et al., "Photo-Thermal Spectroscopic Imaging of MEMS Structures with Sub-Micron Spatial Resolution", Mater. Res. Soc. Symp. Proc. 1415, 35-40 (2012)). What may be an excellent speckle reduction in a stand-off spectroscopy becomes marginally acceptable in microscopy. This may be due to the large numerical aperture objectives and/or high magnification.

Figure 8:
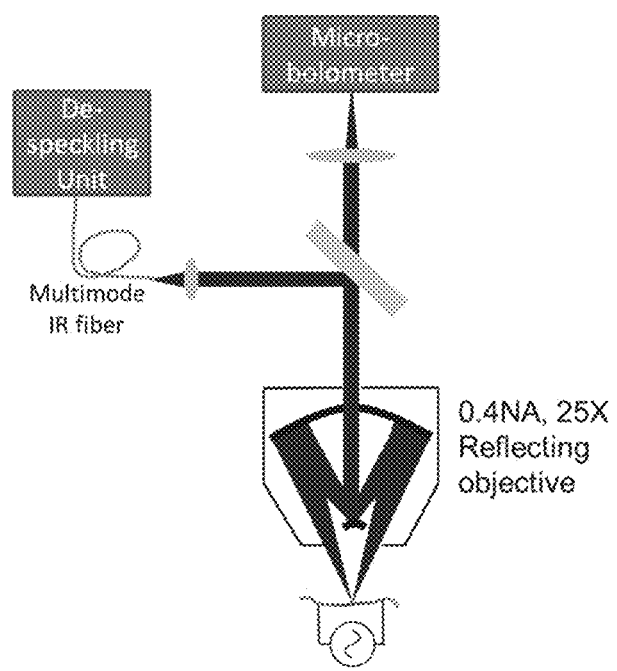
FIG. 8 shows an IR reflectance microscopy setup. For testing purposes, a 127 thick platinum wire was used.

The schematic of the microscope used in this experiment is shown in FIG. 8. The sample is illuminated with light from the de-speckling unit from a multi-mode fiber. This light covers a portion of the field view of the reflecting objective (bright-field illumination). The reflected light is viewed by a micro-bolometer array.

Figures 9A, 9B, 9C:
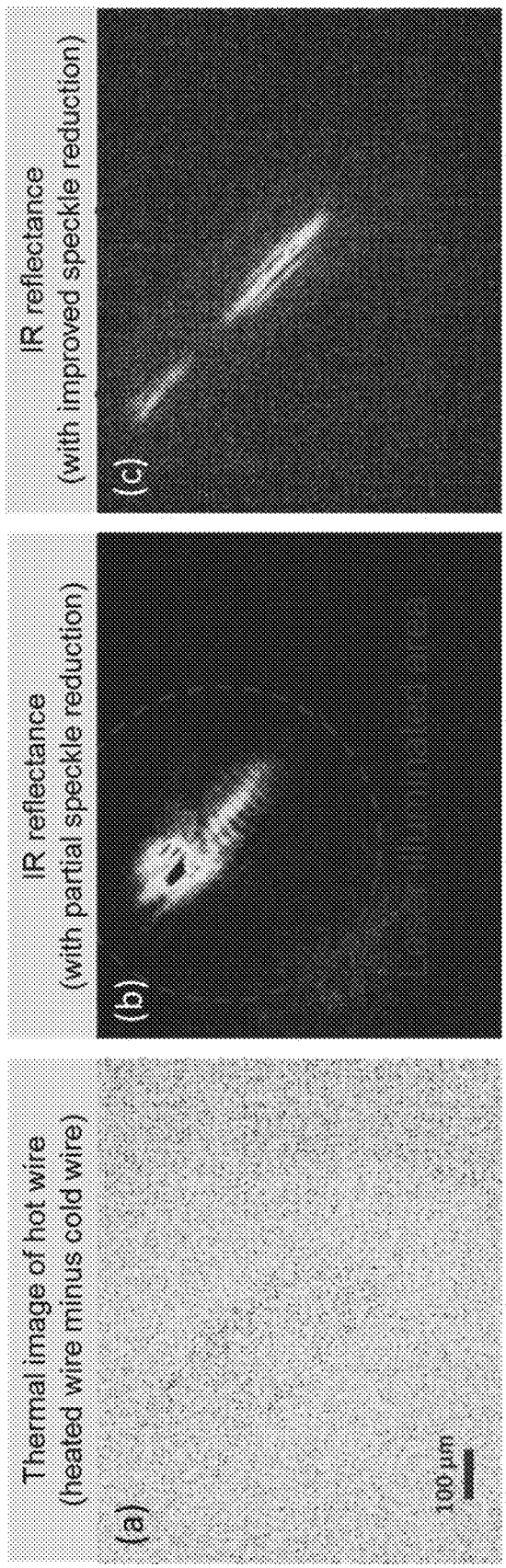
FIGS. 9A-9C show microscope images of a thin wire.

The performance of the microscope was tested by imaging a thin Pt wire (0.005" (127 μm) diameter wire). Passive (thermal emission) differential images of the wire heated by an ac power supply are shown in FIG. 9A. FIGS. 9B and 9C show laser reflectance micrographs using illumination from the speckle reduction unit with the spinning diffuser stopped (FIG. 9B) and moving (FIG. 9C).

Figure 10A:
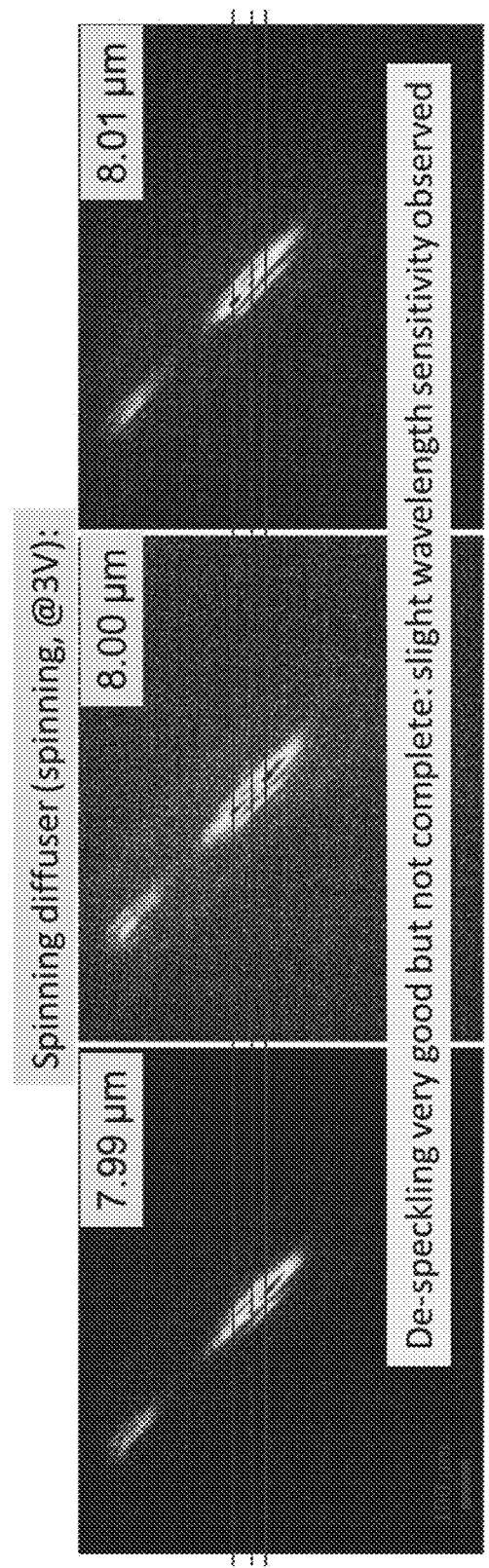
FIGS. 10A and 10B show the influence of changing wavelength on the reflectance micrographs.
Figure 10B:

To better evaluate the speckle reduction performance, the wavelength of the IR laser was changed. Since the wavelength change is small, there is not expected to be a significant difference in the observed micrographs. FIG. 10A shows a minimal change in the reflectance micrographs as the wavelength is tuned, indicative of good speckle reduction. On the other hand, FIG. 10B shows that without proper speckle reduction of the illumination, the micrographs are wavelength dependent and produce an image that is not consistent with the object being imaged.

Exploiting Speckle

Figure 11:
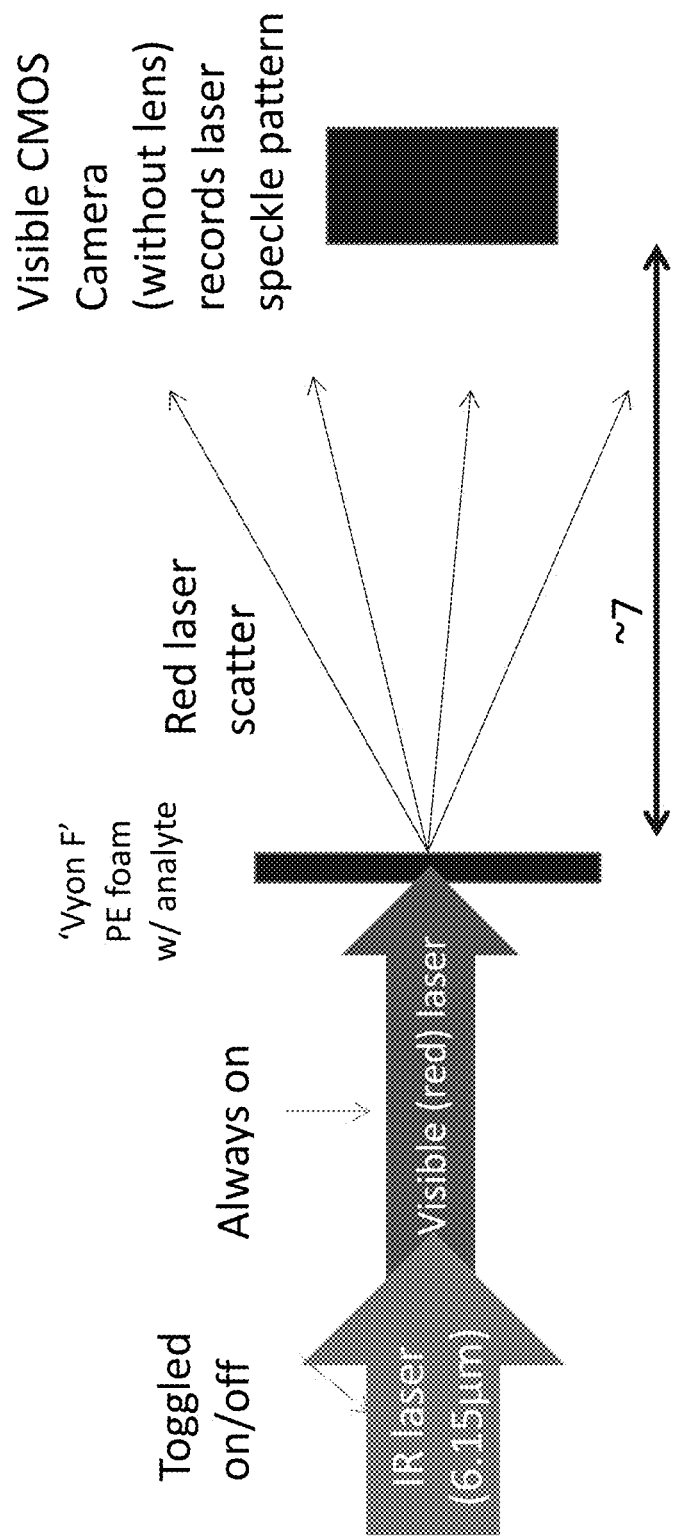
FIG. 11 shows a photo-thermal speckle spectroscopy setup.

Instead of reducing speckle, sometimes you can take advantage of it. FIG. 11 shows a photo-thermal speckle spectroscopy (transmission geometry) set-up. An IR laser is toggled on/off, and a visible (red) laser is always on. The laser beams are focused on a foam, which causes the red laser to scatter. A visible CMOS camera (without lens) records the laser speckle pattern. One can see the speckle pattern shift when the IR laser is turned on. A hypothesis is that when the foam heats up, the cells expand; thus, a change in speckle pattern is observed on the camera.

Photo-Thermal Speckle Spectroscopy

The sample can be deposited (by solvent) into a foamy material (e.g. Vyon F polyethylene). The purpose of the foam is to have many scattering centers so it forms a good speckle pattern.

The sample can also be a liquid (inside the pores), or even a gas or vapor inside the pores (in this case, the foam would have to be contained inside a containment cell with IR and visible light transmitting windows for access of the probe (mostly UV, visible or near IR) and pump (mid IR) beams.

The foam will have to be made of IR transparent material and be of such thickness as to not absorb too much in the IR region. Thick foams will always absorb a lot, even though the foam material is transparent. Therefore, thinner foams are preferred.

It may be feasible to reduce the absorption of IR light into the foam if the foam cells are elongated and oriented such that the polarization state of the laser will decrease coupling into the foam. The analyte is more depolarized, so it will absorb at the same rate. Other ways to minimize absorption (through engineering the pores and/or shape and positioning of the scattering centers to minimize interaction of IR light with the substrate, but keep the analyte absorption at the same level are envisioned.

Another possible way of decreasing the foam IR absorption would be to fill the pores with a liquid that has similar index of refraction in the infrared (but not at the wavelength of the probing visible laser) to the foam. This way the, IR light can pass though the substrate, and the only way it would get absorbed is if the analyte itself (which is stuck inside the pores, or even dissolved in the liquid) absorbs it.

Using rough substrates (such as foam) is beneficial so we don't rely on the analyte itself to provide a rough surface for forming speckle. Also, this way the speckle pattern will be similar, no matter the analyte and its morphology. Also, the amount change in speckle pattern will then be proportional to the analyte concentration.

Another possible substrate would be the thin polyethylene or Teflon cards used in FTIR spectroscopy. They have a milky color and diffuse visible light but are very transparent in the IR.

Any specially design substrate (made out of meta-materials or other engineered surface) that suppresses IR absorption, but causes visible light to scatter (either in the reflected direction—surface scattering, or transmission—volume scattering).

Also, the substrate can also be a photo-thermal microbridge that flexes upon heating (like a bi-metal). The underside could be made rough to induce speckle that can be imaged by using a visible laser on the underside of the bridge.

If the sample consists of a number of particles on an otherwise smooth surface, the speckle from the particles itself can be used. If substrate is also rough, the speckle will be a combination of the two. Given the different roughness of the substrate and particle spacing, these two patterns might be qualitatively different and therefore separable. For example, it is possible that the spatial frequency of the speckle pattern from the particles is different from that of the substrate (use 2D FFT to get spatial frequency map).

Both reflectance and transmission geometry can be used for a system.

Other ways of quantifying the difference in speckle pattern between 2 images:
- using the "curl" operator from vector calculus (or some other means) to analyze the vortices in the speckle pattern.
- 2D fast Fourier transform (FFT) of the image will yield information on the inter-grain distance (spatial frequency of speckle grains).
- temporal FFT of the image pixels (or group of pixels) to extract amplitude at the IR laser modulation frequency.
- if image is not uniform in illumination, adjust image (e.g. rolling background subtraction with intensity correction) before doing any image analysis.

Using shorter wavelengths (e.g. UV) will make the speckle pattern be more sensitive.

Using UV or near IR (or longer wavelengths) of the probe laser would make the probe beam invisible.

Other detection modalities: Use a CCD camera with a given integration time. Synchronize integration such that for half of the integration the IR laser is off and then it turns on for the other half. If the IR light is absorbed, and therefore the speckle pattern changes, we will record a mixture of two speckle patterns. If the IR laser is not absorbed, the speckle pattern in both halves of the integration time will be the same. It is expected that the combined speckle pattern in the former case will have shorter average distance between speckle grain than the former. Other differences can be exploited as well. The advantage is that the CCD is only read out once and this will reduce readout noise.

The IR heating laser can be modulated while the speckle images are collected. By applying a demodulation (at the frequency of the heating) of the processed speckle de-correlation data, we can more accurately (less noisy) determine the heating induced speckle fluctuations.

The previous method can be expanded such that multiple IR lasers can be used at the same time, but modulated at different frequencies. This multiplexing approach can speed up the collection.

Also, by changing the modulation frequency of the heating laser, we can get information of the thermal properties of the analyte (thermal diffusivity, conductivity etc.).

Speckle formation can be enhanced by cycling the probe light back into the substrate using beam splitters, cavities of similar.

Figure 12:
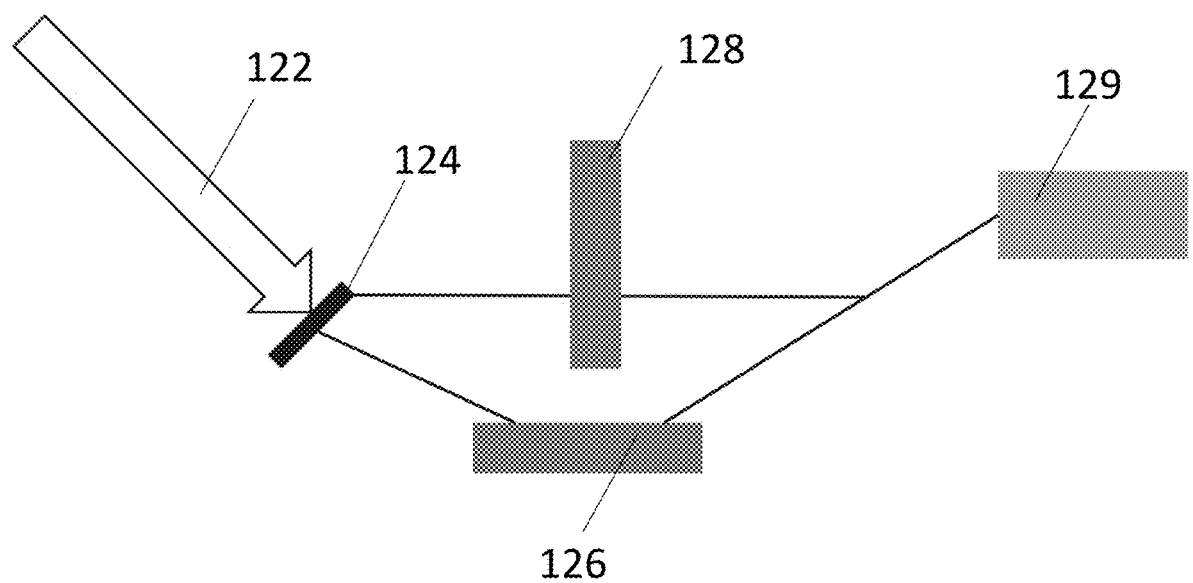
FIG. 12 shows a schematic drawing of a speckle interferometry setup.

Speckle interferometry (FIG. 12): split the illuminating laser beam 122 (using a beam-splitter 124) into two parts— one going through a substrate 126 containing the analyte, the other through a clean substrate 128 only. Then, recombine the two beams and observe the interfered beams with a camera 129. Process as described herein. In another version, propagate the second beam free-space (i.e. not through a clean substrate) and then recombine. In this case, to make the second beam the same size as the first, a beam expander may be needed.

Tuning the IR laser in a continuous (e.g. linear) fashion within its tuning range and monitoring (by analyzing differences in speckle pattern, or other means) the differential heating (between closely spaced wavelengths) can recover the whole photo-thermal spectrum without the need to measure a list of wavelengths. There will be a need to normalize such a spectrum with the optical laser power delivered to the sample. In this modality, if a "fresh" background is needed for speckle pattern comparison, the laser can be modulated (by chopper or electronically, opto-acoustically or other means) to get an "on-off" illumination pattern.

All the modalities in this document (and all other documents referenced herein) could be done either in a microscopy or remote sensing (stand-off, proximal etc.) configuration as well. But the main application tested was for a benchtop lab instrument for chemical detection.

Speckle can be imaged directly or by collecting the visible light with a suitable lens/objective. The goal is maximize speckle pattern change for the given induce temperature change. Additional polarizer, filters or any other optics to achieve this increased speckle pattern change can be utilized.

While probe beam is usually visible. It is possible to envision a single wavelength (probe=pump) experiment. The IR laser itself makes a speckle pattern—this could be viewed using an IR camera.

On resonance, the light doesn't penetrate the particles (or film) of analyte. Off resonance it does. Presumably, this would cause a change in the speckle pattern that can be distinguished from wavelength induced changes alone. The morphology of the speckle may be different. The inter-speckle grain distance may change. In this case, simple speckle pattern movements are not enough, as the wavelength would need to be changed.

The above descriptions are those of the preferred embodiments of the invention. Various modifications and variations are possible in light of the above teachings without departing from the spirit and broader aspects of the invention. It is therefore to be understood that the claimed invention may be practiced otherwise than as specifically described. Any references to claim elements in the singular, for example, using the articles "a," "an," "the," or "said," is not to be construed as limiting the element to the singular.

What is claimed as new and desired to be protected by Letters Patent of the United States is:

1. A photo-thermal speckle spectroscopy device, comprising:
    an infrared (IR) laser that is toggled on and off;
    a visible laser that is always on;
    a substrate, wherein the substrate is a foam, and wherein the substrate comprises an analyte to be tested; and
    a camera;
    wherein the IR laser and the visible laser are directed to the substrate causing the visible laser to scatter, wherein the camera records a speckle pattern, and wherein the speckle pattern changes when the IR laser is turned on.

2. The photo-thermal speckle spectroscopy device of claim 1, wherein the substrate is a polyethylene foam.

3. A photo-thermal speckle spectroscopy device, comprising:
    an infrared (IR) laser that is toggled on and off;
    a visible laser that is always on;
    a substrate, wherein the substrate is a meta-material or other structure that is engineered to suppress IR absorption, and wherein the substrate comprises an analyte to be tested; and
    a camera;
    wherein the IR laser and the visible laser are directed to the substrate causing the visible laser to scatter, wherein the camera records a speckle pattern, and wherein the speckle pattern changes when the IR laser is turned on.

4. A photo-thermal speckle spectroscopy device, comprising:
    an infrared (IR) laser that is toggled on and off;
    a visible laser that is always on;
    a substrate, and wherein the substrate comprises an analyte to be tested; and
    a camera;
    wherein the IR laser and the visible laser are directed to the substrate causing the visible laser to scatter, wherein the camera records a speckle pattern, wherein the visible laser is split such that a portion of it is directed to the substrate and the other part interferes with the reflected speckle pattern before being recorded by the camera, and wherein the speckle pattern changes when the IR laser is turned on.

5. A method of photo-thermal speckle spectroscopy, comprising:
    directing an infrared (IR) laser that is toggled on and off and a visible laser that is always on to a substrate causing the visible laser to scatter, wherein the substrate is a foam, and wherein the substrate comprises an analyte to be tested; and
    recording a speckle pattern with a camera, wherein the speckle pattern changes when the IR laser is turned on.

6. The method of claim 5, wherein the substrate is a polyethylene foam.

7. A method of photo-thermal speckle spectroscopy, comprising:
    directing an infrared (IR) laser that is toggled on and off and a visible laser that is always on to a substrate causing the visible laser to scatter, wherein the substrate is a meta-material or other structure that is engineered to suppress IR absorption, and wherein the substrate comprises an analyte to be tested; and
    recording a speckle pattern with a camera, wherein the speckle pattern changes when the IR laser is turned on.

8. A method of photo-thermal speckle spectroscopy, comprising:
    directing an infrared (IR) laser that is toggled on and off and a visible laser that is always on to a substrate causing the visible laser to scatter, and wherein the substrate comprises an analyte to be tested; and
    recording a speckle pattern with a camera, wherein the visible laser is split such that a portion of it is directed to the substrate and the other part interferes with the reflected speckle pattern before being recorded by the camera, and wherein the speckle pattern changes when the IR laser is turned on.

* * * * *